No. 853,168.
PATENTED MAY 7, 1907.
W. F. GARBE.
HEAD GATE.
APPLICATION FILED AUG. 16, 1906.
2 SHEETS—SHEET 2.
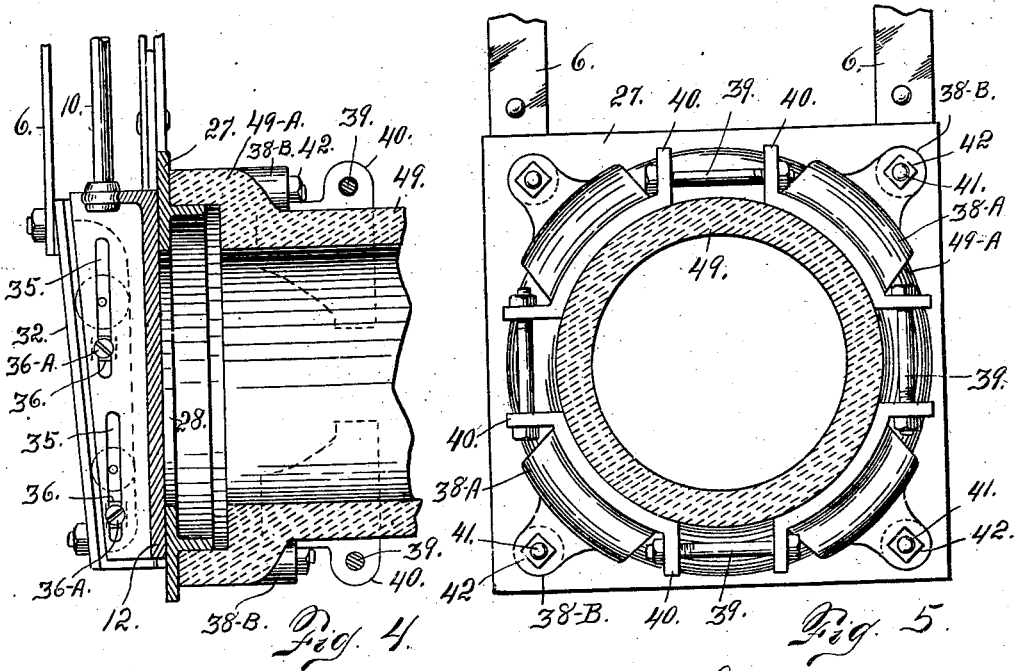
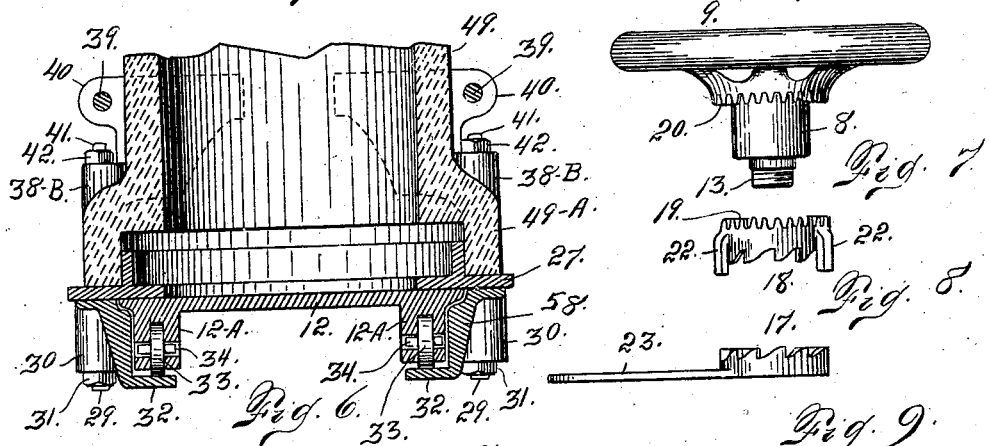
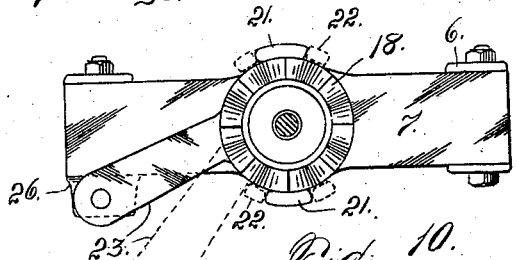
Witnesses
Otto E. Hoddick
Dena Nelson
Inventor
W. F. Garbe.
By
Attorney

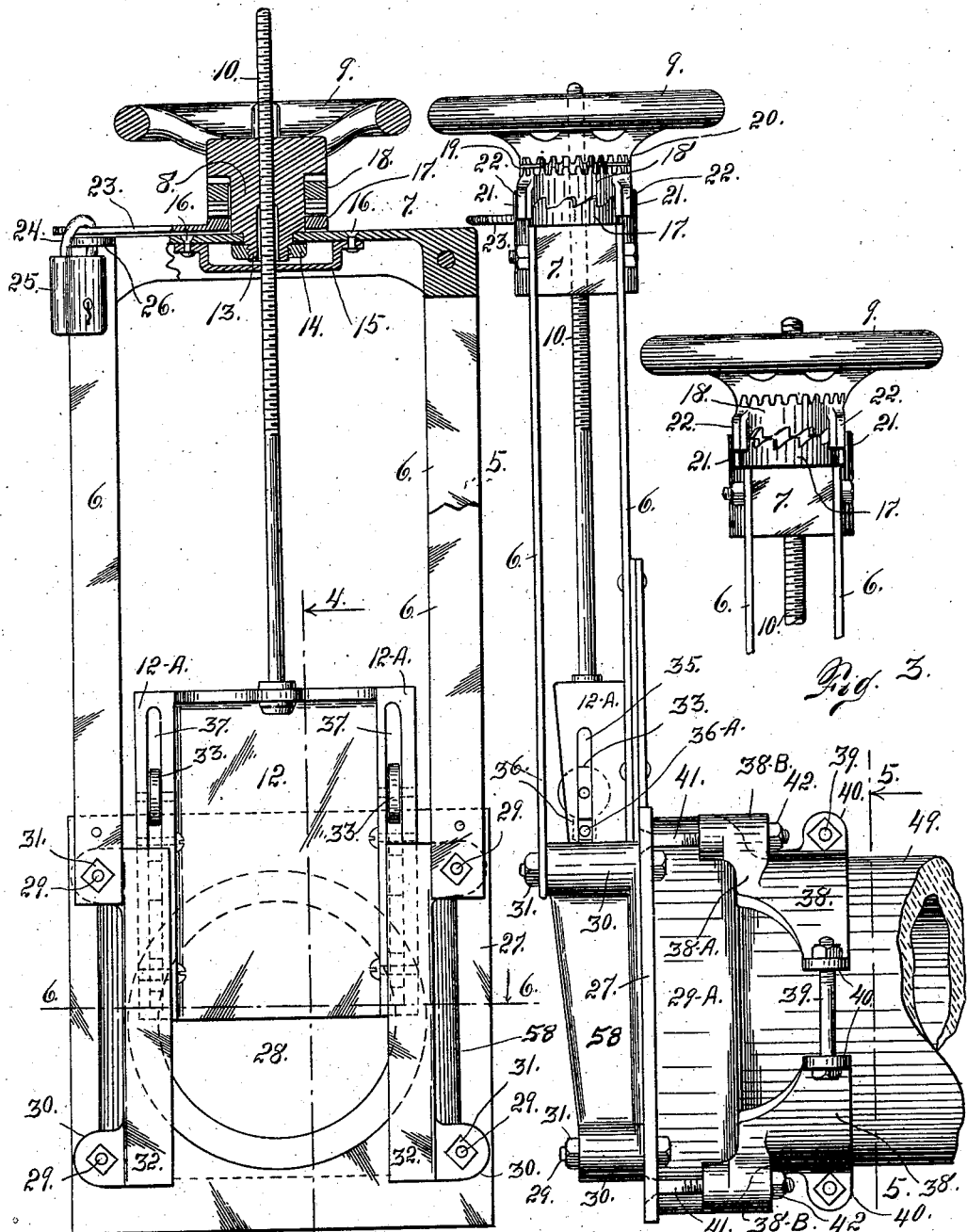

UNITED STATES PATENT OFFICE.

WILLIAM F. GARBE, OF FORT COLLINS, COLORADO, ASSIGNOR OF ONE-HALF TO JAMES J. PIATT AND VERNARD A. BABBITT, BOTH OF FORT COLLINS, COLORADO.

HEAD-GATE.

No. 853,168.  Specification of Letters Patent.  Patented May 7, 1907.

Application filed August 16, 1906. Serial No. 330,923.

*To all whom it may concern:*

Be it known that I, WILLIAM F. GARBE, a citizen of the United States, residing at Fort Collins, in the county of Larimer and State of Colorado, have invented certain new and useful Improvements in Head-Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates generally to improvements in gates or valves for controlling the passage of water or other fluid through a conduit.

The invention as set forth in this application will be especially considered with reference to its use for controlling the flow of water and for this reason it is termed a head gate, though it must be understood that the construction may be employed in other relations.

The novel features of the invention relate to the means for locking the gate in any desired position of adjustment; the means for forcing the gate or valve proper tightly against its seat upon the portion of the frame connected with the conduit, the same being accomplished through the instrumentality of rollers which engage an inclined track during the closing action of the gate whereby a wedging action takes place; and the means whereby the head gate frame is connected with the outlet extremity of the conduit. These features will all be hereinafter described in detail, reference being made to the accompanying drawing in which, Figure 1 is a front view of the head gate partially in section, showing the hand wheel unlocked. Fig. 2 is a side elevation of the same length showing the hand wheel unlocked. Fig. 3 is an elevation of the upper part of the structure showing a portion of the threaded stem of the gate. Fig. 4 is a vertical section taken on the line 4—4 Fig. 1. Fig. 5 is a cross section taken through the conduit on the line 5—5 Fig. 2 viewed in the direction of the arrow. Fig. 6 is a horizontal section taken on the line 6—6 Fig. 1. In this view it is assumed that the head gate is completely closed. Fig. 7 is a detail view of the manipulating hand wheel. Fig. 8 is a detail view of one member of the cam clutch employed in locking the gate. Fig. 9 is a similar view of a cam member coöperating with the member shown in Fig. 8. Fig. 10 is a top view of the structure with a hand wheel and the upper clutch member removed, the gate stem being shown in cross section.

The same reference characters indicate the same parts in all the views.

Let the numeral 5 designate a head gate frame whose upper portion is composed of a pair of separated members 6 located on each side and connected at the top by a yoke or cross piece 7 provided with a central opening through which passes the hub 8 of a hand wheel 9, the said hub having a threaded opening through which passes the threaded stem 10 of the gate proper 12. The lower part of the hub 8 is provided with a reduced portion 13 exteriorly threaded to receive a nut 14 which engages the under surface of the yoke, the latter being, however, centrally recessed and provided with a concealing plate 15 riveted to the yoke as shown at 16, to prevent possible tampering with the structure. The hub of the hand wheel is therefore journaled in the yoke and free to rotate whereby the gate when unlocked is raised and lowered at will.

Revolubly mounted upon the top and central portion of the yoke, is a cam member 17 whose lower surface is flat and whose upper surface is provided with cam teeth adapted to engage counterpart teeth formed on the lower surface of a coöperating cam member 18 whose upper surface is provided with crown teeth 19 adapted to engage similar teeth 20 formed on the hand wheel just above and surrounding the top of the hub. The yoke is provided with upwardly projecting lugs 21, one being located on each side thereof. These lugs form stops to prevent the rotation of the cam member 18 which is provided with two pairs of depending lugs 22, one lug of each pair being located on each side of a lug 21 of the yoke. These lugs 21 and 22 are outside of the cam member 17, leaving the latter to rotate. The member 17 is provided with a manipulating arm 23 whose outer extremity is provided with an opening through which the hasp 24 of the padlock 25 may be passed. The structure is so arranged that when this arm 23 is manipulated to bring its opening into register with an opening in an ear 26 on the frame, the member 18 will be raised to cause its crown teeth to mesh with the teeth 21 of the hand wheel, thus locking the latter against rotation. It will thus be seen that the member 17 is allowed free rotary movement when its arm is unlocked, while the member 18 is allowed free vertical movement, but locked against rotation.

The lower part of the head gate frame is provided with a plate 27 having an opening 28 registering with an opening of a conduit 49 through which the water or other fluid passes. To the opposite sides of this plate 27 are attached angle flanges 58 by means of bolts 29 passed through lugs 30 and secured by nuts 31. Each of these angle flanges has an inwardly projecting member 32 located in front of the reinforced sides 12A of the head gate 12. These members 32 are inclined as they extend downwardly and are engaged by rollers 33 carried by the head gate, the said rollers being provided with pins 34 which enter vertical slots 35 formed in the sides 12A. The upper extremities of the inclined flange members 32 are farthest from the plate 27, and these flange members approach the said plate as they extend downwardly. The rollers 33 protrude forwardly beyond the members 12A and engage the flange members 32 which form a track therefor. As the gate is moved downwardly to the closing position, the rollers engage the parts 32 and are allowed a limited degree of upward movement. These rollers have a wedging action whereby the gate is forced against its seat to form a water tight joint when the gate is in the closed position. The side portions 12A of the head gate are also provided with slots 37 in which the rollers 33 are located and through which they protrude in front. These rollers engage the bottom of this slot in the rear as indicated by dotted lines in Fig. 4. In order to support the rollers in such a position that they will all simultaneously engage the inclined flange parts 32 during the closing movement of the gate I provide the slots 37 with vertically adjustable blocks 36 upon which the rollers rest except when the gate is closed and during the closing movement thereof. These blocks are held in position by screws 36A passed through the slots 35 of the gate.

The plate 27 of the frame, is secured to the bell extremity 29A of the conduit 49, by means of clamping members 38 connected by bolts 39 which pass through ears 40. By means of these bolts the clamping members form a closely fitting band or ring surrounding the conduit in the rear of the bell. The forward part 38A of each clamping member is shouldered to fit the shoulder of the bell and is also provided with a reinforced part 38B apertured to receive fastening bolts 41 whose heads are countersunk in the plate 27 and to whose opposite extremities are applied fastening nuts 42. By reason of this construction the clamping members form an even or perfect bearing upon the shoulder of the bell as the nuts 42 are tightened since the rear portion of the clamps connected by the bolts 39 prevent any rocking tendency. Without the bolts 39 to hold the clamping members in engagement with the conduit, there would be a tendency for the rear portions of the said members to leave the surface of the conduit as the nuts 42 are tightened which would result in an uneven bearing on the bell.

From the foregoing description the use and operation of my improved device will be readily understood. Assuming that the arm 23 of the cam member 17 is unlocked, the partial rotation of this member will throw the two cam members into the relative position indicated in Fig. 3 of the drawing, whereby the member 18 is raised and its crown teeth caused to mesh with the teeth of the hand wheel. The manipulating arm 23 is then in position to be locked. This adjustment is effected after the gate has been raised or lowered to the desired degree.

It will be understood that when the parts are in the position shown in Fig. 2, the hand wheel is free to rotate whereby the gate is raised or lowered at will. As the gate is moved downwardly to the closing position the rollers carried thereby engage the front angle flanges of the head gate frame and force the gate tightly against its seat forming a fluid tight joint as heretofore explained.

Having thus described my invention, what I claim is:

1. In a head gate, the combination with a frame, and a gate provided with a threaded stem, of a manipulating nut engaging the stem of the gate, and two cam members interposed between a shoulder on the nut and the top of the frame, one of the said members being free to rotate and provided with a laterally projecting arm, the other member being vertically movable but locked against rotation, the two members having their engaging surfaces fashioned to cause one member to move vertically as the other member is rotated, the top of the vertically movable member and the shoulder of the nut being fashioned to interlock.

2. In a head gate, the combination with a frame, a gate and a threaded stem connected with the gate, of a shouldered manipulating nut journaled on the frame and engaging the head gate stem, and means interposed between the frame and the shoulder of the nut for locking the latter against movement, substantially as described.

3. In a head gate, the combination with a frame, a gate and a stem connected with the frame, a hand wheel nut engaging the stem of the gate and journaled in the top of the frame, the said nut having a shoulder located above the top of the frame, and adjustable means interposed between the top of the frame and the shoulder of the nut for locking the latter against movement, substantially as described.

4. The combination with a frame, a head gate and a threaded stem connected with the gate, of a nut journaled in the top of the frame and engaging the stem of the gate, the said nut having a hub and a shoulder at the top of the hub, two cam members surrounding the hub of the nut above the frame, one of them being revoluble on the hub and the other being vertically movable but locked against rotation, the adjacent faces of the said members being so fashioned that when the revoluble member is actuated, vertical movement may be imparted to the other member, the upper surface of the vertically movable member being toothed to interlock with corresponding teeth formed on the shoulder of the nut.

5. In a head gate, the combination with a frame, a gate proper and a threaded stem, of a nut journaled in the top of the frame, and means interposed between the top of the frame and a shoulder on the nut, for locking the latter against movement, substantially as described.

6. A head gate comprising a frame, the gate proper, a stem connected with the gate, a nut journaled in the top of the frame and provided with a hub and a reduced threaded part, the latter passing through the top of the frame, a nut applied to the lower threaded extremity of the screw, and a concealing plate riveted to the top of the frame and concealing the nut for the purpose set forth.

7. The combination with a frame, a vertically movable gate, and a threaded stem connected with the gate, of a nut journaled in the top of the frame and engaging the threaded stem of the gate, two cam members interposed between the top of the frame, and a shoulder on the nut, one of the members being revolubly mounted and the other vertically movable but locked against rotation, the revoluble member being provided with a manipulating arm having an opening, the frame of the gate having an apertured ear adapted to register with the opening of the arm, the adjacent faces of the cam members being fashioned to cause the vertically movable member to move upwardly as the other member is rotated, the vertically movable member being fashioned to interlock with the shoulder on the nut for the purpose set forth.

8. The combination with a frame, of a vertically movable head gate, the frame being provided with angle flanges on opposite sides forming ways for the gate, a portion of each flange projecting inwardly in front of the adjacent parts of the gate, the latter being provided with rollers loosely mounted and engaging the said angle flanges which are inclined to produce a wedging action by virtue of the engagement of the rollers of the gate with the said flange for the purpose set forth.

9. The combination with a suitable frame, of a vertically movable gate, the frame being provided with ways to receive the gate on opposite sides of the opening to be controlled thereby, the said ways having inclined members, and the gate having rollers adapted to engage the inclined members of the frame, the rollers being vertically movable in the gate.

10. The combination with a head gate frame provided with ways, a gate vertically movable in the ways of the frame, one of the said instrumentalities being provided with rollers vertically movable, while the other member is provided with inclined parts which the rollers engage whereby a wedging action is produced as the gate is moved to the closed position.

11. The combination with a head gate frame provided with ways on opposite sides, a vertically movable gate engaging the ways of the frame, the said gate being provided with slots intersecting at right angles, rollers having their body portions occupying one set of slots and their axles occupying another set of slots, the axles forming guides for the rollers during their vertical movement, the said rollers protruding from the gate in front and engaging the ways for the purpose set forth.

12. The combination of a gate or valve and a seat therefor, the valve seat having ways adapted to receive the gate or valve, one of the said instrumentalities being provided with rollers mounted to have both a revoluble and vertical movement and arranged to engage the other instrumentality to produce a wedge action during the closing movement of the device.

13. The combination with a conduit having a bell end, of a head gate frame, and means for fastening the frame to the bell end of the gate comprising a band or ring surrounding the conduit adjacent its bell end and composed of a number of clamping members connected by bolts, the said members being shaped to fit the shoulder of the bell and provided with reinforced apertured parts, and bolts connected with the frame and passing through the said apertured parts parallel with the axis of the conduit and suitably secured in place.

14. The combination with a head gate frame and a conduit having a bell end, of means for connecting the frame with the bell end, said means comprising a ring or band surrounding the conduit adjacent its bell extremity and composed of a number of clamping members connected by bolts extending at right angles to the axis of the conduit, said clamping members being shaped to fit the shoulder of the bell, and other bolts connecting the clamping members with the frame and extending parallel with the axis of the conduit.

In testimony whereof I affix my signature in presence of two witnesses.

WILLIAM F. GARBE.

Witnesses:
A. J. O'BRIEN,
DENA NELSON.